(12) United States Patent
Henry

(10) Patent No.: US 7,980,186 B2
(45) Date of Patent: Jul. 19, 2011

(54) SOIL SHAPING SYSTEM FOR PRECISION GROUND ENGAGING IMPLEMENT

(75) Inventor: Jim Henry, Sakatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/470,369

(22) Filed: May 21, 2009

(65) Prior Publication Data

US 2010/0294182 A1  Nov. 25, 2010

(51) Int. Cl.
*A01C 5/00* (2006.01)
*A01C 13/00* (2006.01)
(52) U.S. Cl. ........ 111/152; 111/164; 111/167; 111/193; 111/194
(58) Field of Classification Search .................. 111/149, 111/152, 157, 163–169, 190–196
See application file for complete search history.

(56) References Cited

U.S. PATENT DOCUMENTS

| | | |
|---|---|---|
| 1,404,795 A | 1/1922 | Ruszczak |
| 1,492,970 A | 10/1922 | Ellwood |
| 2,061,348 A | 11/1936 | Cogdill |
| 2,415,577 A | 2/1947 | Buschue |
| 3,177,830 A | 4/1965 | Zimmerman |
| 3,316,865 A | 5/1967 | Williams |
| 4,088,083 A | 5/1978 | Dail, Jr. et al. |
| 4,213,408 A | 7/1980 | West et al. |
| 4,361,191 A * | 11/1982 | Landoll et al. ................ 172/146 |
| 4,596,200 A | 6/1986 | Gafford et al. |
| 4,633,791 A | 1/1987 | Lindstrom et al. |
| 6,871,709 B2 | 3/2005 | Knobloch et al. |
| 6,945,182 B1 | 9/2005 | Haukaas et al. |
| 7,308,859 B2 | 12/2007 | Wendte et al. |

FOREIGN PATENT DOCUMENTS

JP  2005 23 7279  9/2005

* cited by examiner

*Primary Examiner* — Christopher J. Novosad
(74) *Attorney, Agent, or Firm* — Rebecca Henkel

(57) ABSTRACT

In an embodiment, an agricultural implement includes a frame configured to couple to a tool bar, a parallel linkage coupled to the frame and a ground engaging tool extending from a shank, where the shank is coupled to the parallel linkage. The agricultural implement also includes a packer wheel configured to control a depth of a valley opened in a soil region by the ground engaging tool and is configured to pack the soil region as the implement is towed through a field and a soil shaping assembly disposed between the ground engaging tool and the packer wheel, wherein the soil shaping assembly is configured to close the valley prior to packing by the packer wheel.

10 Claims, 5 Drawing Sheets

SOIL SHAPING SYSTEM FOR PRECISION GROUND ENGAGING IMPLEMENT

BACKGROUND

The present invention relates generally to the field of agricultural implements, such as tillers, seeders and implements towed behind a work vehicle, such as a tractor. Specifically, the invention relates to precision seeding and ground engaging implements.

Ground engaging implements may include a ground engaging tool or opener that forms a seeding path or valley for seed deposition into the soil. The ground opener is used to break the soil to enable seed deposition. After the seed is deposited, the opener may be followed by a packer wheel that packs the soil on top of the deposited seed. The packer wheel may be rigidly mounted behind the opener via a structural member or rear frame.

Unfortunately, the packer wheel may not enable an optimum amount of soil to flow into the valley prior to packing the soil. As such, the uneven finish of the soil in the field is not optimal for germination, reducing the seeding efficiency. Positioning the packer wheel rearward may enable some soil to flow into the valley, but will reduce depth control of the ground opener, due to the increase in distance between the wheel and opener.

BRIEF DESCRIPTION

In an embodiment, an agricultural implement includes a frame configured to couple to a tool bar, a parallel linkage coupled to the frame and a ground engaging tool extending from a shank, where the shank is coupled to the parallel linkage. The agricultural implement also includes a packer wheel configured to control a depth of a valley opened in a soil region by the ground engaging tool and is configured to pack the soil region as the implement is towed through a field and a soil shaping assembly disposed between the ground engaging tool and the packer wheel, wherein the soil shaping assembly is configured to close the valley prior to packing by the packer wheel.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
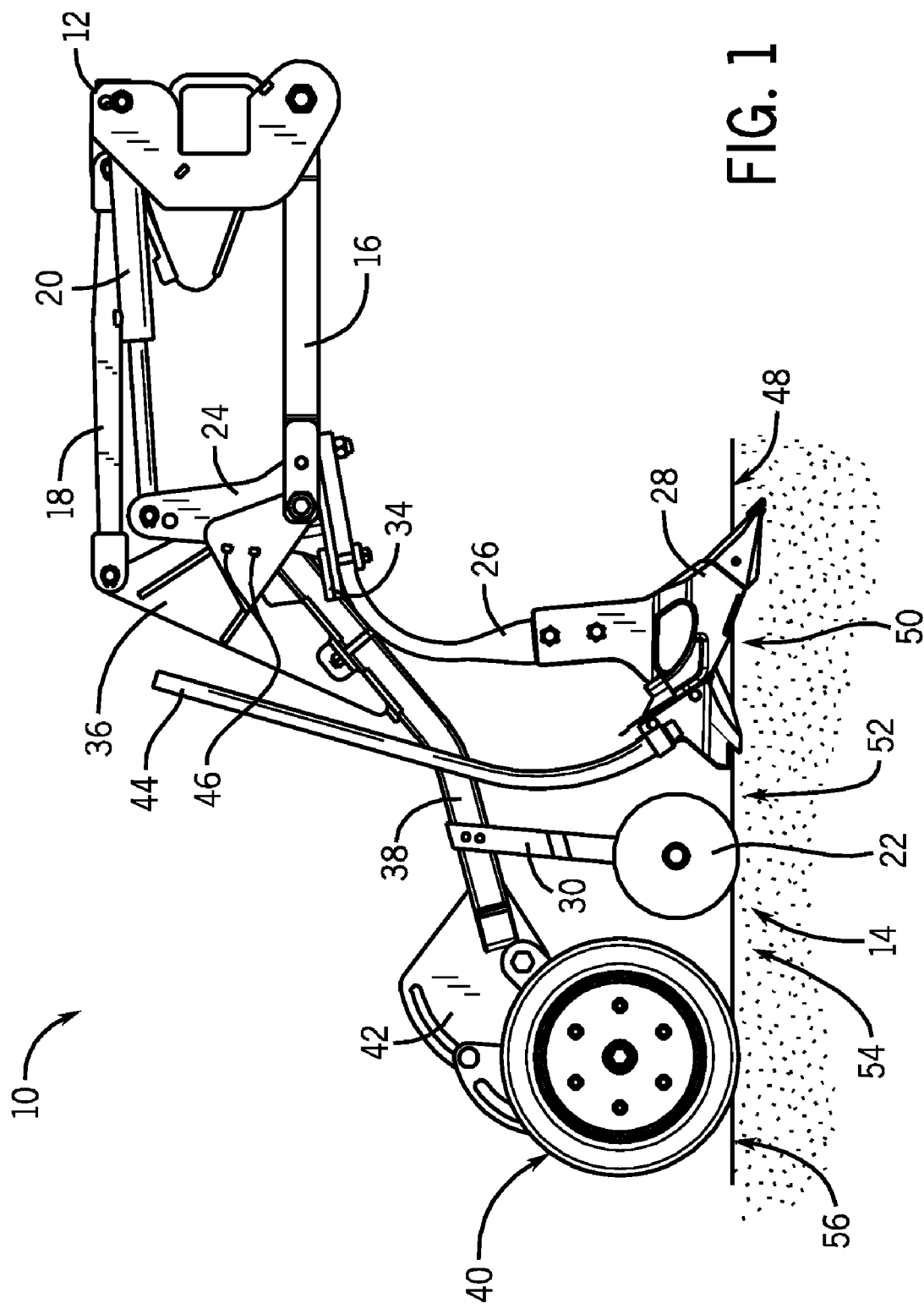
FIG. 1 is a side view of a precision hoe opener assembly in accordance with aspects of the invention, including an opener, a packer wheel, and a soil shaping assembly.

Turning now to the drawings and referring first to FIG. 1, an embodiment of a precision hoe opener assembly is illustrated and designated generally by reference numeral 10. As will be appreciated by those skilled in the art, hoe opener assembly 10 is a type of row unit, which may be placed on an agricultural implement, such as a seeder. Precision opener assembly 10 includes a frame support 12, a soil shaping assembly 14, a first member 16, a second member 18, and a linear actuator such as a cylinder 20 (e.g., hydraulic and/or pneumatic piston-cylinder assembly). Cylinder 20 may be hydraulically coupled to a power supply that is used to provide a flow of pressurized hydraulic fluid that displaces a piston rod extending from the cylinder. Precision hoe opener assembly 10 may be towed, or generally moved by a vehicle, such as a tractor. For example, the frame support 12 may interface with a tool frame or tow bar connected to the tractor (not shown) for towing the precision hoe opener assembly 10. For instance, a plurality of opener assemblies 10 may be mounted in parallel along a tool frame bar to comprise a seeder unit. As discussed below, the precision hoe opener 10 enables the depth of penetration of the opener in the soil to be controlled by an attached packer wheel, thereby enabling each of the openers of a seeder unit to be independently controlled for improved seeding performance. Alternatively, in other systems, the depth of each opener coupled to a tool bar may be controlled in a similar manner, such as a supporting wheel coupled to the tool bar. For example, the depth of a soil valley or groove created by the hoe openers may increase as the supporting wheel lowers the tool bar toward the soil.

As depicted, the precision hoe opener assembly 10 includes at least one disk 22 coupled via a bracket to the assembly. The disk 22 and soil shaping assembly 14 may be arranged to direct soil into a valley, to provide optimized soil conditions for seed growth. As may be appreciated, components of the opener assembly 10, such as frame support 12, mounting brackets 14, first member 16, and second member 18, may be made of any suitable material, such as steel or a metal alloy.

Cylinder 20 is attached to a shank adapter 24 via a pin at the end of the piston rod. The shank adapter 24 is also coupled to a shank 26 and a ground engaging opener 28. Shank adapter 24 may be coupled to the shank 26 via fasteners, allowing position adjustments of the opener 28, which, along with a packer wheel, enables a variable seeding depth for the opener assembly 10. Further, the position of the disk 22 may also be configured by a bracket 30. The bracket 30 may enable a plurality of ground engaging tools, such as disks or harrow tines, to direct soil via height and angular adjustments of the tools. In the illustrated embodiment, pin 32 is coupled to the first member 16 and to the shank adapter 24, allowing the shank adapter 24 to pivotally rotate about the pin 32 as the cylinder 20 extends and retracts. Accordingly, the opener 28 moves downwardly or upwardly based upon the cylinder extension or retraction, respectively. Shank adapter 24 may feature several holes to receive a pin coupling the end of cylinder 20 to the adapter. The adapter holes may be used to adjust the angle of the cylinder 20 with respect to the parallel linkage assembly, thereby changing the angle and magnitude of cylinder forces.

As the cylinder 20 retracts, a stop plate 34 may press on a rear frame 36, creating a lifting force that is conveyed to a packer wheel arm 38. The resulting lifting force, caused by the cylinder 20, reduces the packing force of a packer wheel 40 and may eventually lift packing wheel 40 from the terrain.

In the embodiment, the packer wheel assembly 42 may allow height adjustment of packer wheel 40, in the form of fastener and slot or an equivalent structure. As depicted, the position of packer wheel 40 controls the depth of a valley opened in the soil by the opener 28 via opener assembly components, such as packer wheel arm 38, rear frame 36, shank adapter 24 and shank 26.

In some cases, the resulting lifting force may compensate for an increased packing force caused by terrain elevation changes, thereby increasing seeding accuracy. Elements 12, 16, 18, 36 and 20 may be collectively described as components of a hydraulically driven parallel linkage assembly. The parallel linkage assembly may also be referred to as a four bar linkage. To facilitate seed deposition during operation, the opener 28 is coupled to a seed distribution header via a seeding tube 44. In the depicted embodiment, as the terrain elevation fluctuates, the hoe opener position will move upwardly or downwardly from the illustrated neutral position. Cylinder 20 may be extended, thereby deploying the opener 28 downwardly into the terrain, pressing the shank adapter 24 against rear frame stops 46. Soil surface 48 may be shaped and directed by the opener 28, soil shaping assembly 14 and packer wheel 40. By minimizing space between the soil shaping assembly 14, packer wheel 40 and opener 28, seeding depth control is improved for the system. Accordingly, as will be described in reference to FIGS. 5-8, the soil profile, including valleys and berms, may vary between positions 50, 52, 54 and 56 due to the arrangement of precision hoe opener assembly 10.

In the present context, the term "deployed position" may be used to describe the precision hoe opener 10 in a ground-engaging, working position where the shank adapter 24 is pressed against rear frame stops 46 and opener 28 is engaged with the terrain. For example, while in a deployed position, the opener 10 may vertically travel up to eight inches (20 cm) as the opener 28 goes over and maintains contact with the contours of a terrain. During sharp changes in elevation, the opener 28 is maintained at a substantially constant angle with the terrain by the parallel linkage and the extension and retraction of cylinder 20. Moreover, the configuration enables individualized, precise control of the seeding depth for each opener assembly 10 over variable terrain. In the depicted deployed position, the cylinder 20 also exerts a downward force on the packer wheel 40. When cylinder 20 retracts, opener 28 is lifted from the deployed position. When in the fully retracted position, stop plate 34 presses against a contact surface, lifting packer wheel 40 upward. As the opener assembly 10 retracts fully, opener 28 and packer wheel 40 are lifted from the terrain surface 52. The fully retracted position may be utilized when transporting the seeder between fields or between seeding locations within a field, to minimize wear and tear on the opener.

As may be appreciated, the configuration of shank adapter 24, first member 16 and rear frame 36 allows the actuator to pivotally move shank 26 and opener 28 through an angular range independently of packer wheel assembly. That is, in the range of motion between stop plate 34 and rear frame stops 46, shank adapter 24 and cylinder 20 cause only movement of the opener 28. In contrast, when in a deployed position, the opener 28 and the terrain are maintained at a substantially constant angle by the parallel linkage assembly. The arrangement may also be helpful as the hoe opener 10 encounters large clods or trash and the actuator 20 is retracted, the shank adapter is released from contact with the frame stops 46, lifting opener 28, thereby reducing wear or damage that may be caused by such impediments. In addition, the configuration includes soil shaping assembly 14, which enables creating a smoother finish to the soil and higher travel speeds for the implement and towing vehicle. The smoother soil finish improves moisture distribution and provides soil packing that encourages germination of the seed or product deposited by the opener assembly 10.

Figure 2:
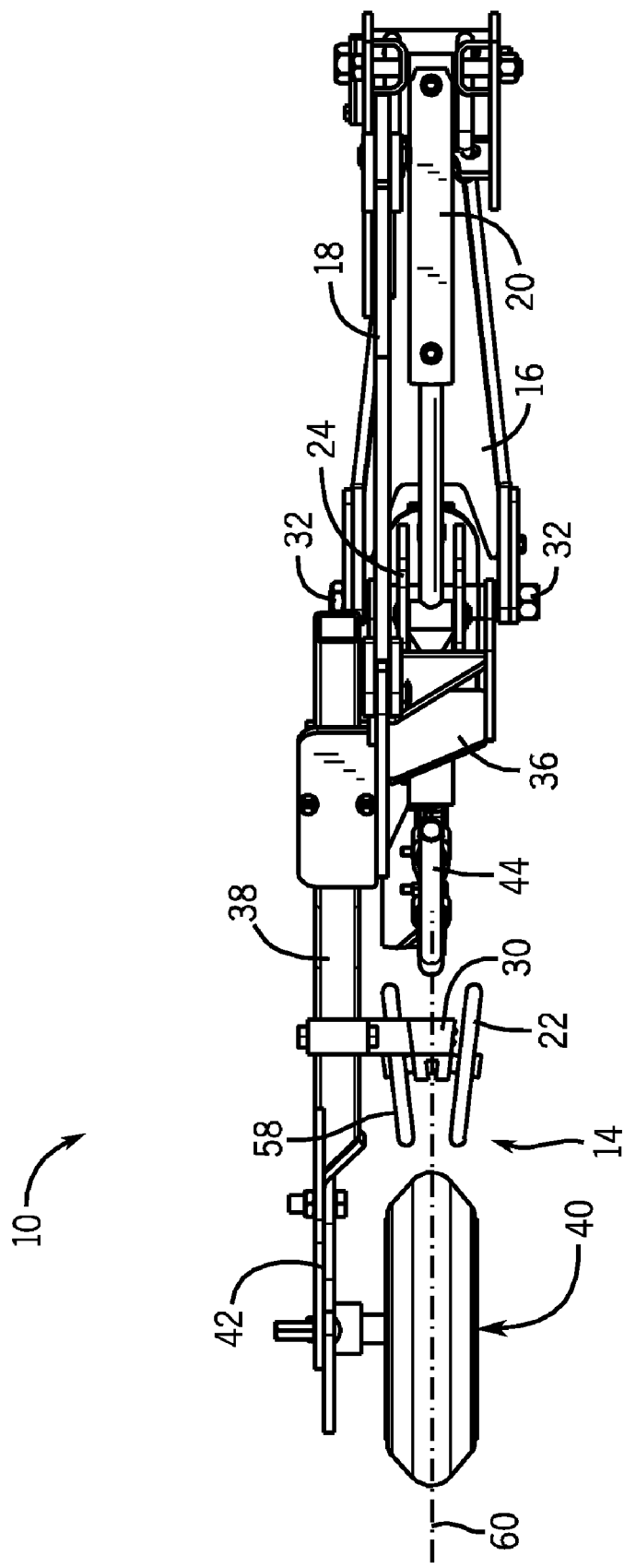
FIG. 2 is a top view of the opener assembly of FIG. 1, showing the opener implement, soil leveling and packer wheel assemblies.

A top view of the precision hoe opener assembly 10 is illustrated in FIG. 2. The figure shows cylinder 20, first member 16, second member 18, shank adapter 24, soil shaping assembly 14 and rear frame 36. The embodiment illustrates that pin 32 is used to couple and control movement of many components of opener assembly 10, including first member 16, rear frame 36, and shank adapter 24. The view also illustrates that packer wheel arm 38 positions packer wheel 40 behind the soil shaping assembly and the opener 28. Further, the soil shaping assembly 14 includes a pair of disks 22 and 58, each coupled to the bracket 30. Alternatively, a single disk may be coupled to the bracket 30, wherein the disk is configured to fill a valley in the seed path. In addition, the soil shaping assembly may include two or more ground engaging tools, such as harrow tines, plows, disks or a combination thereof, positioned to direct soil into the valley. As depicted, the disks 22 and 58 are angled with respect to a centerline 60. The centerline 60 is oriented in the direction of travel of the opener 10. Alternatively, the disks 22 and 58 may each be angled in a different direction or parallel to the centerline 60. Further, disks 22 and 58 may be straight disks or concave disks including flat or fluted edges.

As may be appreciated, the soil shaping assembly 14 may be coupled via bracket 30 to the packer wheel arm 38 via bolts and nuts coupled through the arm and bracket, U-bolts disposed around the arm, welds and/or other suitable rigid and durable coupling mechanisms. The soil shaping assembly 14 may be a kit that a user can purchase to add to an existing opener 10 or may be a component of an opener assembly 10. The disclosed embodiments of precision opener 10 provide control of the seeding depth and soil surface by controlling the positions of opener 28, soil shaping assembly 14 and packing wheel 40. The opener assembly 10 advantageously responds to variations in the terrain, draft force on the opener 28, the packing force, or a combination thereof. Further, the components and arrangement of opener assembly 10 enable the packer wheel 40 to precisely control the depth and position of opener 28. Moreover, the soil shaping assembly 14 enables control of soil finish and characteristics to enable quick germination. Thus, the opener assembly 10 can provide a generally uniform packing force and seeding depth to improve the overall quality of the seeding process, and in turn improve subsequent growth originating from the seeds. Again, the hoe opener 10 has a variety of adjustment mechanisms to control the location of the packer wheel 40, the opener 28 or a combination thereof.

Figure 3:
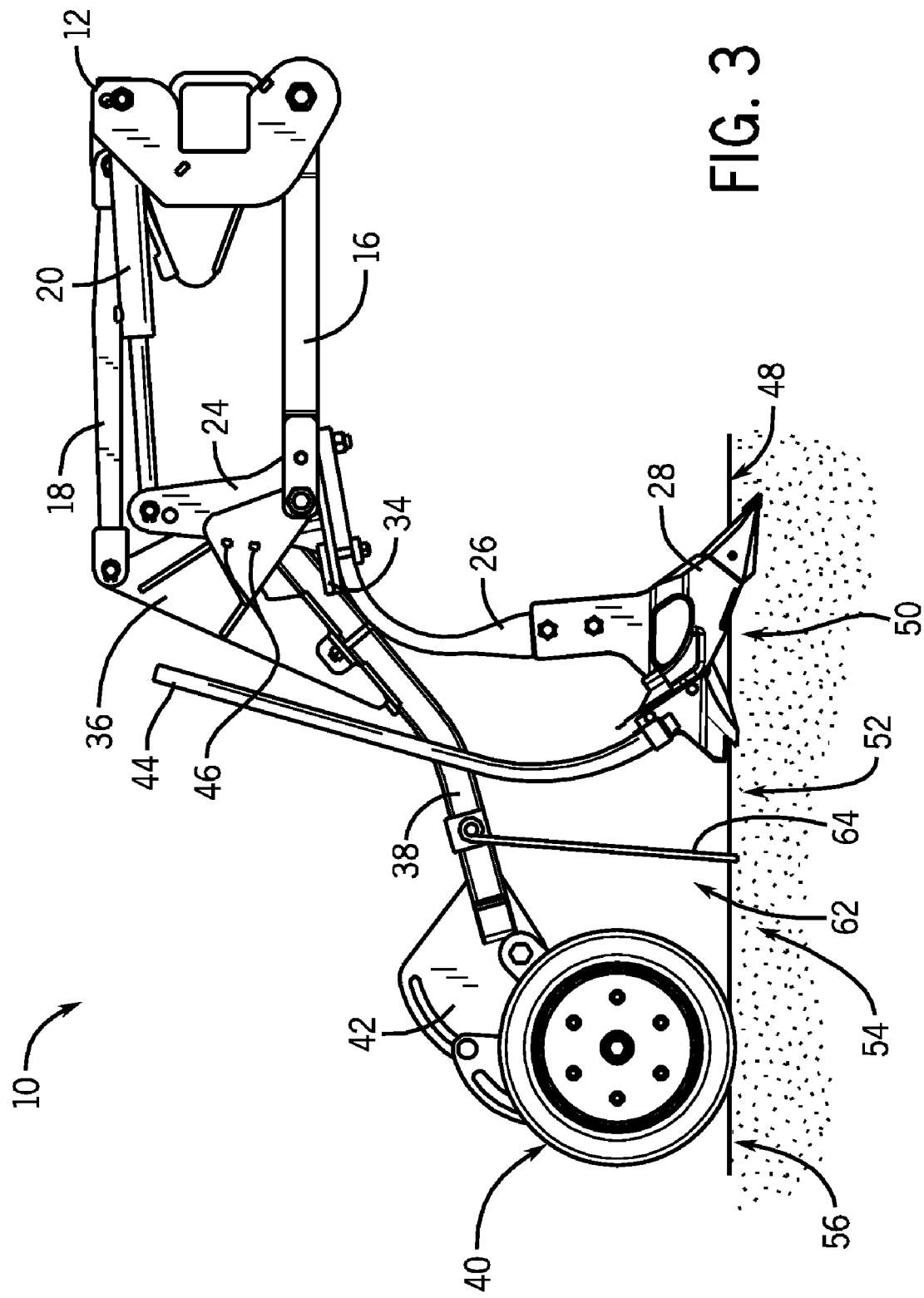
FIG. 3 is a side view of another embodiment of a precision hoe opener assembly in accordance with aspects of the invention, including an opener, a packer wheel, and a soil shaping assembly.

FIG. 3 is a side view of an example of the precision opener assembly 10. As depicted, the precision hoe opener assembly 10 includes the frame support 12, first member 16, second member 18 and linear actuator 20. The four bar linkage provided by the precision hoe opener assembly 10 is coupled to the shank 26 along with the packer wheel arm 38, wherein the height or depth of the hoe opener 28 may be controlled individually (by the opener assembly 10) via the packer wheel 40. Accordingly, as the precision hoe opener assembly 10 is towed across a field the packer wheel 40 adjusts for the changes in elevation to maintain a desired depth for the hoe opener 28, thereby improving a seeding process. Further, the packer wheel 40 and other components enable a more accurate control of the depth of the opener 28 by positioning the packer wheel 40 proximate or closer to the shank 26 and opener 28. Accordingly, the valley created in the soil by the hoe opener 28 may be too large for the packer wheel 40 to substantially fill in the valley to provide a substantially level soil surface.

A substantially level soil surface may increase crop germination, improve seeding accuracy and reduce soil compaction. Therefore, a soil shaping assembly 62 may be located between the hoe opener 28 and packer wheel 40. The soil shaping assembly 62 includes at least one harrow tine 64, which directs soil into the valley created by the hoe opener 28, thereby providing a substantially filled in valley for the packer wheel 40 to pack. After packing of the filled valley, the result is a substantially flat or level soil surface. In addition, the soil shaping assembly 62 may create a mound in the filled valley to be packed by the packer wheel 40. The tine 64 may be composed of a durable material that is resistant to bending or breaking. For example, the tine 64 may be composed of a stainless steel or a metal alloy. Further, the tine 64 may be mounted via a biasing spring mechanism, enabling the tine to move or be displaced rearward upon encountering an obstacle in the soil 48, such as a rock or dirt clod. Further, the soil shaping assembly 14 shown in FIGS. 1 and 2 may include a biasing mechanism, such as a spring, enabling the disks 22 and 58 to be displaced or retract upon encountering an obstacle in the soil 48. The depicted arrangement enables the soil valley to be closed after a seeding process, via seeding tube 44, prior to a packing of the soil surface region by the packing wheel 40.

Figure 4:
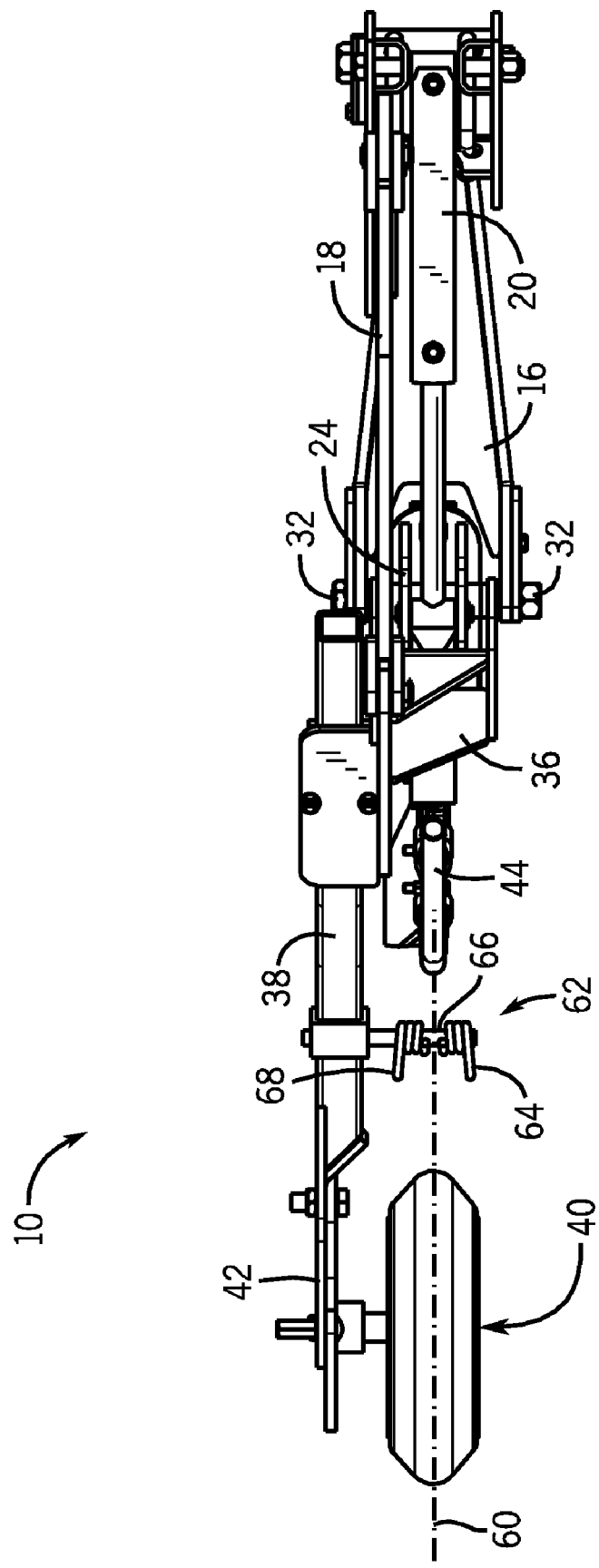
FIG. 4 is a top view of the opener assembly of FIG. 3, showing the opener implement, soil leveling and packer wheel assemblies.

FIG. 4 is a top view of the precision hoe opener assembly 10 of FIG. 3, including the soil shaping assembly 62. As depicted, the harrow tine 64 is coupled to a bracket member 66, along with a second harrow tine 68. As depicted, the harrow tines 64 and 68 are coupled via biasing spring mechanisms to the bracket member 66, enabling the harrow tines to avoid breaking or bending upon encountering an obstacle. Alternatively, other ground engaging tools may be coupled to the soil shaping assemblies to provide soil shaping to fill in valleys following a seeding. For example, a soil shaping assembly may include a disk and a harrow tine. Another example may include 3, 4 or 5 harrow tines.

Figure 5:
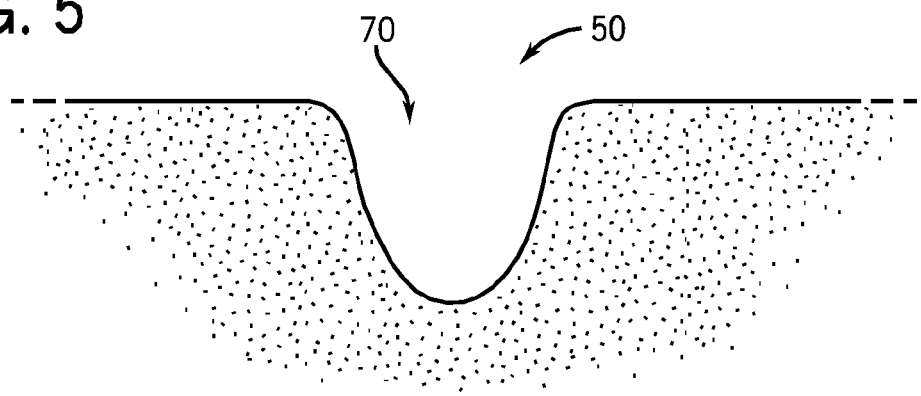
FIG. 5 is a profile view of an example of a soil path valley created by an opener implement.
Figure 6:
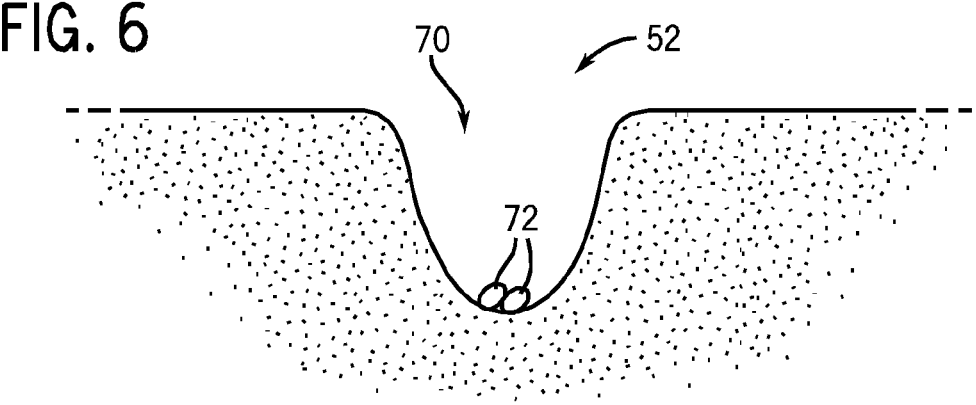
FIG. 6 is a profile view of an example of a soil path valley after seeding by a seeding mechanism of an implement.
Figure 7:
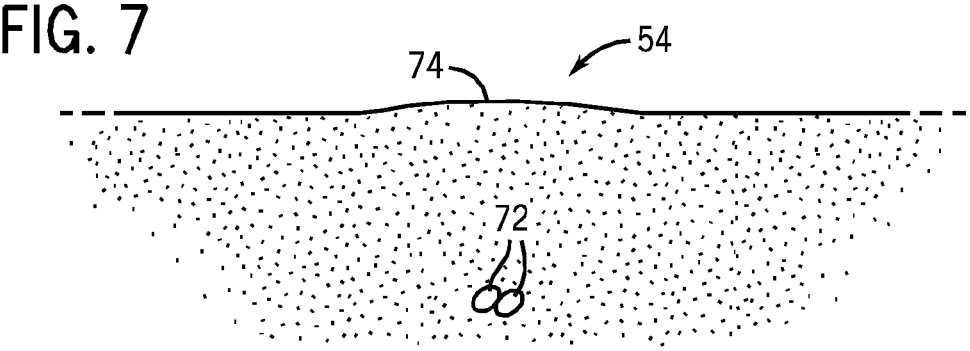
FIG. 7 is a profile view of an example of a soil path valley after soil leveling by a soil shaping assembly.
Figure 8:
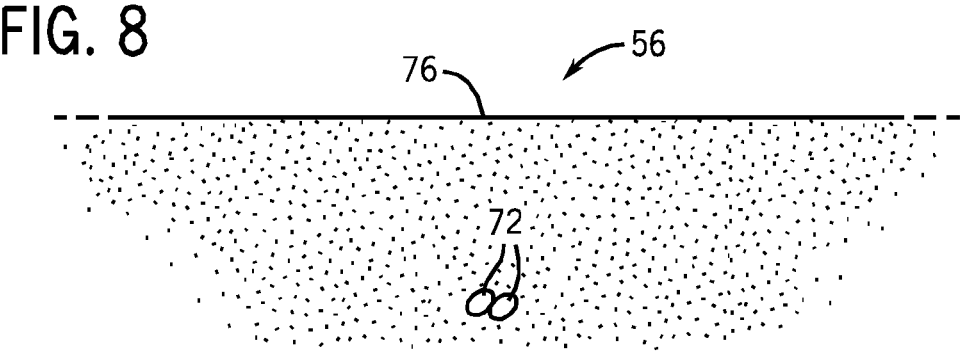
FIG. 8 is a profile view of an example of a soil path valley after packing by a packing wheel.

FIGS. 5 through 8 are illustrations of a profile of the soil surface region beneath the precision hoe opener assembly 10 at various stages of the seeding process. In FIG. 5, a valley 70 in the soil has been created by the hoe opener 28 for placement of a product, such as a seed or chemical. Accordingly, the valley 70 in the soil has been created prior to seeding and recovering the soil surface. FIG. 6 is an illustration of the soil surface region at a location 52 behind the seeding mechanism, after a seed 72 has been deposited in the valley 70. FIG. 7 is a profile view of the soil surface region after the soil shaping assembly 14 or 62 has directed soil into the valley 70, thereby producing a filled in valley or mound 74. As depicted, the seeds 72 have been deposited at a precise depth controlled by the hoe opener assembly 10 and the valley 70 depth. As shown in FIGS. 1 and 3, location 54 in the soil is directly behind the soil shaping assemblies 14 and 62, thereby producing the mound 74 for packing by the packer wheel 40. FIG. 8 is a profile view of the soil location 56 directly behind the packer wheel after a packing process produces a substantially flat soil surface 76. As may be appreciated, the substantially flat soil surface improves moisture distribution within the soil, germination and reduces soil compaction.

The depicted embodiments of the precision hoe opener assembly 10 and soil shaping assemblies 14 and 62 improve seeding performance by providing an arrangement that directs soil into the soil valley 70 created by the hoe opener 28 prior to packing by the packer wheel 40. The arrangement enables the packer wheel 40 to remain close or proximate to the opener 28 to maintain precision depth control of the seeding process. Moreover, the improved soil surface that results from the arrangement will improve moisture distribution and germination. Further, the soil shaping assemblies 14 and 62 enable an increased travel speed for the implement across a field by providing a mechanism for filling the soil valley prior to packing by the packer wheel. The increased travel speed may enable a faster seeding process, further improving efficiency. In a presently contemplated embodiment without the soil shaping assemblies 14 and 62, the precision hoe opener assembly 10 may use a reduced travel speed to provide time for the soil to settle after opening of the valley. The soil shaping assemblies 14 and 62 provide a mechanism to fill the valley without a need for time to allow soil settling and a reduced travel speed of the implement. Further, the soil shaping assemblies 14 and 62 enable the individually controlled depths of each precision hoe opener assembly 10 to improve seeding performance and accuracy by providing a substantially level soil surface as an output of the precision hoe opener assembly 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
   a frame configured to couple to a tool bar;
   a linkage coupled to the frame;
   a ground engaging tool extending from a shank, wherein the shank is coupled to the linkage via a shank adapter;
   a packer wheel configured to control a depth of the ground engaging tool and a resultant valley opened in the soil by the ground engaging tool, and to pack the soil as the implement is towed through a field;
   a hydraulic cylinder extending between the frame and the shank adapter, wherein the hydraulic cylinder is configured to control a downward force of the ground engaging tool, the packer wheel, or a combination thereof; and
   a soil shaping assembly disposed between the ground engaging tool and the packer wheel, wherein the soil shaping assembly is configured to close the valley prior to packing by the packer wheel.

2. The implement of claim 1, wherein the soil shaping assembly comprises a disk.

3. The implement of claim 1, wherein the soil shaping assembly comprises a harrow tine.

4. The implement of claim 1, wherein the soil shaping assembly comprises a pair of angled disks.

5. The implement of claim 1, wherein the linkage is a parallel linkage.

6. The implement of claim 1, comprising a seeding mechanism to deposit a seed product in the valley.

7. The implement of claim 1, wherein the ground engaging tool comprises a hoe opener.

8. The implement of claim 1, wherein the soil shaping assembly comprises a biasing mechanism.

9. The implement of claim 1, comprising a packer wheel arm extending between the packer wheel and the linkage.

10. The implement of claim 9, wherein the soil shaping assembly is coupled to the packer wheel arm.

* * * * *